US011223639B2

(12) United States Patent
Mandrychenko

(10) Patent No.: US 11,223,639 B2
(45) Date of Patent: Jan. 11, 2022

(54) ENDPOINT NETWORK TRAFFIC ANALYSIS

(71) Applicant: Fortinet, Inc., Sunnyvale, CA (US)

(72) Inventor: Oleksii Mandrychenko, Edinburg (GB)

(73) Assignee: Fortinet, Inc., Sunnyvale, CA (US)

(*) Notice: Subject to any disclaimer, the term of this patent is extended or adjusted under 35 U.S.C. 154(b) by 509 days.

(21) Appl. No.: 16/295,122

(22) Filed: Mar. 7, 2019

(65) Prior Publication Data
US 2020/0287920 A1 Sep. 10, 2020

(51) Int. Cl.
*H04L 29/06* (2006.01)
*G06F 9/54* (2006.01)
*G06F 16/2458* (2019.01)
*H04L 29/08* (2006.01)
*G06F 21/57* (2013.01)

(52) U.S. Cl.
CPC .......... *H04L 63/1425* (2013.01); *G06F 9/545* (2013.01); *G06F 16/2477* (2019.01); *G06F 21/577* (2013.01); *H04L 67/2857* (2013.01)

(58) Field of Classification Search
CPC ............. H04L 63/1425; H04L 67/2857; G06F 16/2477; G06F 9/545; G06F 21/577
See application file for complete search history.

(56) References Cited

U.S. PATENT DOCUMENTS

| 8,887,274 | B2 | 11/2014 | Buchanan et al. | |
|---|---|---|---|---|
| 10,250,624 | B2* | 4/2019 | Mixer | H04L 63/1425 |
| 10,382,492 | B2* | 8/2019 | Degioanni | G06F 21/52 |
| 10,454,950 | B1* | 10/2019 | Aziz | H04L 63/1441 |
| 10,476,903 | B2* | 11/2019 | Wilson | H04L 63/1416 |
| 10,855,700 | B1* | 12/2020 | Jeyaraman | H04L 63/1416 |
| 11,036,751 | B2* | 6/2021 | Dang | G06F 16/2365 |
| 11,057,414 | B1* | 7/2021 | Giorgio | G06N 7/005 |
| 2016/0099963 | A1* | 4/2016 | Mahaffey | H04W 12/12 726/25 |
| 2017/0214701 | A1* | 7/2017 | Hasan | H04L 63/1491 |
| 2018/0069881 | A1 | 3/2018 | Graves et al. | |

(Continued)

OTHER PUBLICATIONS

Weaver (Identifying Anomalous Port-Specific Network Behavior, 2010, 46 pages) (Year: 2010).*

(Continued)

*Primary Examiner* — Oleg Korsak
(74) *Attorney, Agent, or Firm* — HDC Intellectual Property Law, LLP

(57) ABSTRACT

Systems and methods for an agent-based approach that facilitates endpoint network traffic analysis are provided. According to an embodiment, an agent running on an endpoint device associated with an enterprise network collects network communication metadata from the endpoint device responsive to receiving callbacks from a kernel-level tracing facility implemented within an OS of the endpoint device and locally stores the collected network communication metadata. Further, the agent performs time-based aggregation of the collected metadata to reduce transmission bandwidth and local storage requirements. The aggregated metadata from the endpoint device is submitted to an anomaly detection service when the endpoint device is connected to the enterprise network. The anomaly detection service uses a machine-learning based approach for detection of anomalous behavior.

18 Claims, 14 Drawing Sheets

(56) References Cited

U.S. PATENT DOCUMENTS

2018/0351979 A1   12/2018   Mandrychenko et al.

OTHER PUBLICATIONS

Chandola et al. (Anomaly Detection : A Survey, 2009, 72 pages) (Year: 2009).*
Goldstein et al. (A Comparative Evaluation of Unsupervised Anomaly Detection Algorithms for Multivariate Data, 2016, 31 pages) (Year: 2016).*

* cited by examiner

NETWORK METADATA TABLE 400

| ID | DATE TIME WITH UTC OFFSET | BYTES SENT | BYTES RECEIVED | SOURCE IP ADDRESS | SOURCE PORT NUMBER | SOURCE DNS HOST NAME | ... |
|---|---|---|---|---|---|---|---|
| 1 | 21-01-2019T16:10:10+02:00 | 1024 | 128 | 10.1.1.120 | 673 | e37.acme.com | --- |
| 2 | 21-01-2019T16:10:10+02:00 | 132 | 44281 | 10.1.1.120 | 673 | e37.acme.com | --- |

| DESTINATION IP ADDRESS | DESTINATION PORT NUMBER | DESTINATION DNS HOSTNAME | PROTOCOL | PROCESS ID (PID) | APPLICATION NAME | ... |
|---|---|---|---|---|---|---|
| 46.32.123.53 | 443 | 14s.example.com | tpc-ip-4 | 154 | foo.exe | --- |
| 46.32.123.53 | 443 | 14s.example.com | tpc-ip-4 | 154 | foo.exe | --- |

| USER NAME | TYPE OF NETWORK ACTIVITY |
|---|---|
| bob@acme.com | SEND |
| bob@acme.com | RECEIVE |

FIG. 4A

Aggregation Table 420

| ID | Aggregation, Minute |
|----|---------------------|
| 1  | 10                  |
| 2  | 1440                |

Application Table 430

| ID | Start Date and Time | Stopped Date Time | PID | Full Path |
|----|---------------------|-------------------|-----|-----------|
| 1  | 21-01-2019T16:10:10+02:00 | NULL | 154 | C:\Program Files (x86)\Bar\foo.exe |
| 2  | 21-01-2019T16:10:10+02:00 | NULL | 44 | C:\Program Files (x86)\Bar\foo.exe |
| ... | ... | ... | ... | ... |

| SHA1 | Security Source | Command Line Args |
|------|-----------------|-------------------|
| 5fj3...243 | 0.1 | -s 1 |
| 673 | e37.acme.com | - |
| ... | ... | ... |

ENDPOINT NETWORK TRAFFIC ANALYSIS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2019, Fortinet, Inc.

BACKGROUND

Field

Embodiments of the present invention generally relate to network security and network defense systems. In particular, embodiments of the present invention relate to an improved approach for acquiring and aggregating network communication metadata using an agent-based approach on a monitored endpoint device associated with an enterprise network and applying deep learning models to the network communication metadata by a cloud-based service, for example, to detect potential anomalous or risky network behavior by the monitored device even when it is not connected to the enterprise network.

Description of the Related Art

Network traffic analysis is the process of capturing and analyzing network traffic for various purposes, including, but not limited to performance, security and network management. The analysis can be used to identify potential anomalies in network traffic of monitored endpoint devices that may be indicative of the existence of malware and/or risky activities being performed on the monitored endpoint devices. Such analysis can also be used to monitor download/upload speeds, throughput, content, and the like to manage overall performance of the network infrastructure. Receipt of proactive alerts by a network administrator regarding the detection of anomalies in network traffic aids in addressing underlying network issues and/or traffic problems before end users, applications, and/or operations of an enterprise are impacted.

Existing approaches for network traffic analysis suffer from a variety of limitations. For example, monitoring of corporate devices (e.g., desktop computers, laptop computers, tablet computers, smart phones, and/or other endpoint devices associated with an enterprise network) typically involves the use of network probes/nodes deployed within an enterprise network and installed at the network router level to analyze and process organizational traffic within, to and from the enterprise network. Notably, however, such an approach leaves a gap when the monitored corporate device is not connected to the enterprise network. For example, when the corporate device is connected to a network (e.g., a home network, a 4G mobile network or a hotspot) other than the enterprise network, the physical isolation from the enterprise network prevents existing network traffic analysis tools deployed within the enterprise network from collecting and analyzing network traffic associated with the roaming corporate device.

Furthermore, various existing network traffic analysis approaches, which require storage of massive amounts of network traffic, prohibit performance of network traffic analysis on devices with limited resources (e.g., computational, storage and/or bandwidth). In the context of network traffic analysis systems relying upon the use of network probes/nodes deployed within the enterprise network, as the amount of data collected and the number of monitored endpoint devices increases, the analysis not only becomes slower but also increases the need for implementation of a significant storage-based architecture, thereby increasing the cost and complexity of the enterprise network.

Therefore, there is a need for a more effective approach for network traffic analysis that, among other things, reduces storage/bandwidth requirements and provides protection of monitored corporate devices even when they are not connected to the enterprise network.

SUMMARY

Systems and methods are described for an agent-based approach that facilitates endpoint network traffic analysis. According to one embodiment, an agent running on an endpoint device associated with an enterprise network collects network communication metadata from the endpoint device by receiving callbacks from a kernel-level tracing facility implemented within an operating system of the endpoint device. The callbacks are responsive to system calls relating to network events including receipt or transmission of one or more packets by the endpoint device via a network to which the endpoint device is coupled. The collected network communication metadata is stored in a database. The agent reduces transmission bandwidth and local storage requirements for the collected network communication metadata by performing a time-based data aggregation on the collected network metadata. When the endpoint device is connected to the enterprise network, the agent causes the aggregated network metadata to be analyzed for anomalous behavior by transmitting the aggregated network communication metadata to an anomaly detection service via a gateway device of the enterprise network. When the endpoint device is not connected to the enterprise network, the agent locally stores the aggregated network communication metadata for subsequent transmission to the anomaly detection service.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 4A-C illustrate exemplary tables used for aggregation of network communication metadata in accordance with an embodiment of the present disclosure.

DETAILED DESCRIPTION

Figure 1:
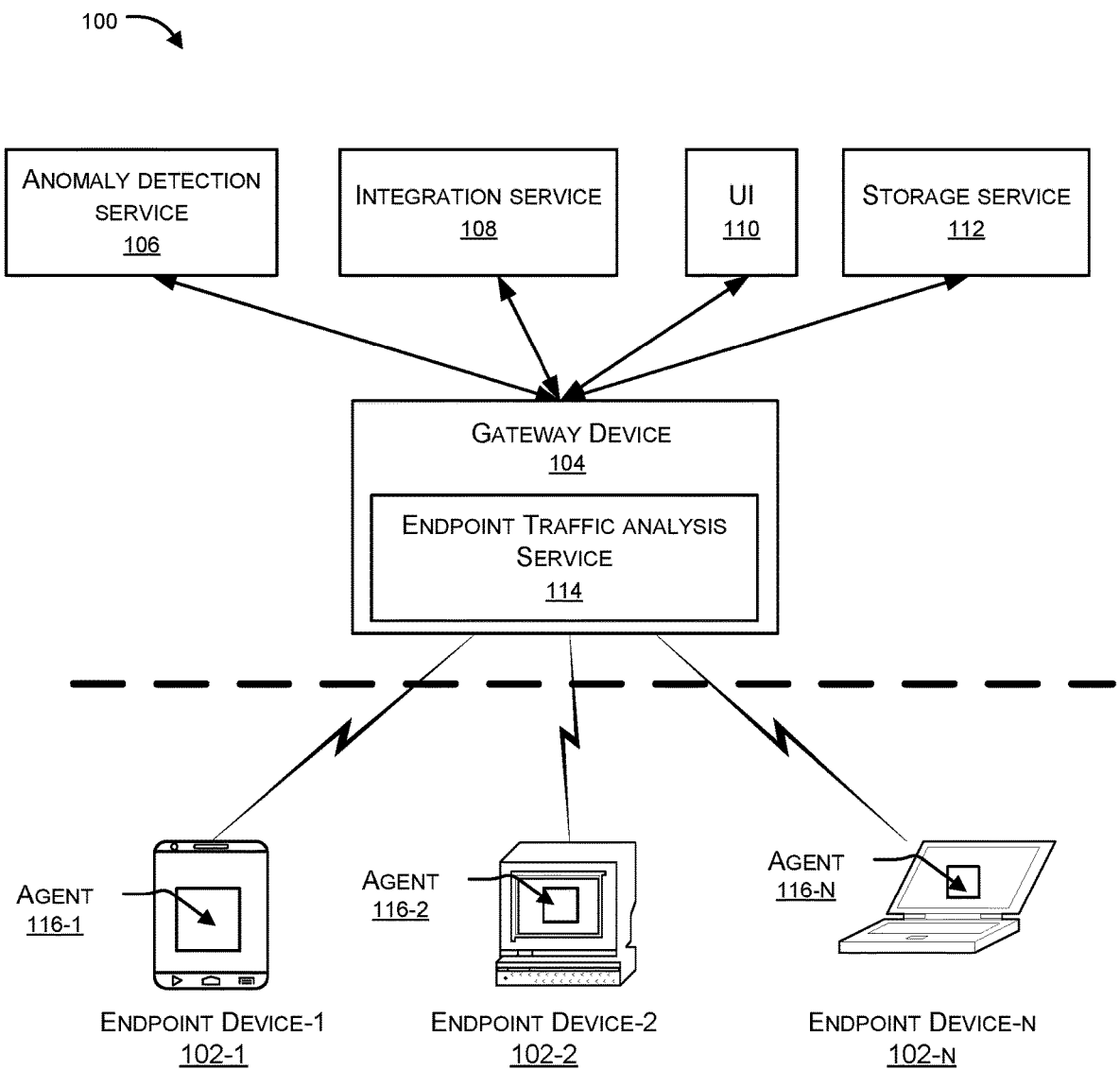
FIG. 1 is a simplified network architecture in which aspects of the present invention can be implemented in accordance with an embodiment of the present invention.

Systems and methods are described for an agent-based approach that facilitates endpoint network traffic analysis. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "endpoint device" generally refers to a network-capable computer hardware device, typically on a Transmission Control Protocol (TCP)/Internet Protocol (IP) network. Non-limiting examples of endpoint devices include servers, desktop computers, laptops, smart phones, tablets, thin clients, Internet of Things (IoT) devices, printers or other specialized hardware (e.g., Point of Sale (POS) terminals and smart meters).

The phrase "endpoint protection system" generally refers a system that (i) focuses on protecting endpoint devices in a network from cyber threats and attacks by malicious internal and external threats, (ii) provides endpoint management functionality, for example, allowing a network administrator to identify and manage the users' computers access over a corporate or enterprise network and/or (iii) protects the enterprise network by blocking access attempts and/or other risky activity at these points of entry to the enterprise network. An endpoint protection system may proactively defend endpoints with one or more of pattern-based anti-malware technology, behavior-based exploit protection, web-filtering, and an application firewall. For example, a network administrator may configure the endpoint protection system to restrict certain website access to specific users in order to maintain and comply with an organization's policies and standards. Similarly, an endpoint protection system may provide antivirus/antimalware, sandbox protection and/or vulnerability management scanning and may additionally be configurable to remediate identified issues and/or automatically quarantine a suspicious or compromised endpoint in order to contain incidents and stem outbreaks. Non-limiting examples of endpoint protection systems include the FortiClient endpoint security solution (available from the assignee of the present invention), Cybereason, Sentinel. One endpoint security software, Stormshield SES, ForeScout CounterAct, Promisec PEM, CounterTack Sentinel, CrowdStrike Falcon Host, Guidance Software Encase, and Comodo Advanced Endpoint Protection.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

It will be appreciated by those of ordinary skill in the art that the diagrams, schematics, illustrations, and the like may represent conceptual views or processes illustrating aspects of various embodiments of the present invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually. Those of ordinary skill in the art further understand that the exemplary hardware, software, processes, methods, and/or operating systems described herein are for illustrative purposes and, thus, are not intended to be limiting in nature.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Embodiments of the present disclosure provide an agent-based approach for analysis of endpoint network traffic, visualization of network connections (e.g., DNS queries, traffic flow (normal and abnormal), access to historic forensic records for the entire enterprise of a subscribing entity and detection of anomalies and/or risky network behavior by monitored endpoint devices even when they are not connected to the enterprise network. Non-limiting examples of risky network behavior by a monitored endpoint device includes the use of unapproved tools and shadow Information Technology (IT) infrastructure/services (e.g., the use of private could backup tools).

According to an embodiment, an agent of an endpoint device makes use of operating system (OS) kernel-level reporting capabilities to create a lightweight, fast and network adapter independent source of network communication metadata. Lightweight generally refers to use of minimal resources of the endpoint device by the agent. To be considered a lightweight agent in the context of this disclosure, the lightweight agent's usage of CPU cycles of the endpoint device should not exceed approximately 0.5% and the lightweight agent's usage of RAM of the endpoint device should not exceed approximately 5 Megabytes (MB). In one embodiment, the lightweight agent uses between approximately 0.05% and 0.5% of the CPU cycles of the endpoint device and between approximately 2 MB and 5 MB of RAM of the endpoint device. The agent collects the network communication metadata (also referred to herein as simply "network metadata"), which is a restricted subset of network traffic information that does not contain actual packet data, but rather contains information about the network traffic, for example, the source and the destination, including the date and time of the transfer, protocol, ports, amount of data sent/received, and the like.

In order to provide further storage reduction over conventional network traffic analysis approaches, in one embodiment, in addition to collecting network metadata, which excludes the actual packet data, the agent also performs time-based aggregation of the collected network metadata. In this manner, both transmission bandwidth and local storage requirements are reduced, thereby enabling the agent-based approach described herein to be deployed on Internet of Things (IoT) devices having limited resources, for example, in terms of one or more of computational processing, memory, and/or bandwidth. As described further below, in one embodiment, the aggregated network metadata from the endpoint device is submitted to a cloud-based endpoint traffic analysis service for anomaly detection via a gateway device associated with the enterprise network when the endpoint device is connected to the enterprise network.

FIG. 1 is a simplified network architecture 100 in which aspects of the present invention can be implemented in accordance with an embodiment of the present invention. In the context of the present example, an end-point traffic analysis service 114 is implemented via a gateway device 104 of an enterprise network. Endpoint devices 102-1, 102-2 . . . 102-N (which may be collectively referred to herein as endpoint devices 102 and may be individually referred to herein as endpoint device 102) associated with the enterprise network may execute respective agents 116-1, 116-2 . . . 116-N (which may be collectively referred to herein as agents 116 and may be individually referred to herein as agent 116) within user address space of a virtual memory provided by the OS of the respective endpoint device 102. In one embodiment, agent 116 is a standalone program. Alternatively, agent 116 may be integrated within and implemented as part of another application running on endpoint device 102. Integrating agent 116 within an endpoint protection system running on end point device 102 is thought to be a natural fit.

In embodiments of the present invention, certain processing is said to be performed on the client-side, representing endpoint devices 102, which can include, but are not limited to, personal computers, smart devices, web-enabled devices, hand-held devices, laptops, IoT devices, tablet computers, mobile phones and the like. Those skilled in the art will appreciate that, the enterprise network can include a wireless network, a wired network or a combination thereof that can be implemented as one of the different types of networks, such as an Intranet, a Local Area Network (LAN), a Wide Area Network (WAN), the Internet, and the like. Further, the enterprise network can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

In an aspect, agent 116 may collect network communication metadata including any or a combination of a process identifier (PID), a source Internet Protocol (IP) address, a source port identifier, a source Domain Name System (DNS) host name, a destination IP address, a destination port number, a destination DNS host name, a protocol, a protocol version, an application name, a username, a timestamp, a type of network activity (e.g., send or receive) and a number of bytes transferred/received from/by endpoint device 102 by receiving callbacks from a kernel-level tracing facility implemented within an OS of endpoint device 102. In an embodiment, agent 116 may subscribe to network-related internal application programming interface (API) calls directly or indirectly via the kernel-level tracing facility. In another embodiment, agent 116 may indirectly interact with the kernel-level tracing facility via Event Tracing for Windows (ETW) or similar facilities, packages or tools provided for other operating systems, including, but not limited to, the Linux Trace Toolkit Next Generation (LTTng) open source tracing framework for Linux, DTrace in iOS or Mac OS X, and the like. The callbacks may be triggered responsive to system calls performed on the endpoint device 102 relating to network events (e.g., receipt or transmission of one or more packets by endpoint device 102 via a network to which the endpoint device is coupled). Those skilled in the art will appreciate that the network may be any suitable network to which endpoint device is connected, which may be different from the enterprise network.

In an aspect, agent 116 can store the collected network communication metadata in one or more databases on endpoint device 102. Further, the agent 116 can perform a time-based data aggregation on the collected network metadata to reduce transmission bandwidth and local storage requirements for the collected network communication metadata. In an embodiment, performing the time-based data aggregation can include running a variant of a Structured Query Language (SQL) query with a predefined time interval on the database and saving results of the SQL query in a new row of a separate database table.

In an aspect, using an event dispatcher (not shown) implemented in agent 116 to detect a connection between endpoint device 102 and gateway device 104, agent 116 can determine whether endpoint device 102 is connected to the enterprise network such that when the determining is affirmative, agent 116 can cause the aggregated network metadata to be analyzed for anomalous behavior by transmitting the aggregated network communication metadata to an anomaly detection service. According to architecture 100, anomaly detection service 106 can be operatively coupled with endpoint traffic analysis service 114 of gateway device 104 of the enterprise network such that aggregated metadata is transmitted to anomaly detection service 106 via gateway device 104.

In an aspect, when the determining is negative (i.e., endpoint device 102 is not connected to the enterprise network, agent 116 can locally store the aggregated network communication metadata for subsequent transmission to anomaly detection service 106 at a time when the determining is affirmative (i.e., when endpoint device 102 is connected to the enterprise network).

In an embodiment, when the aggregated network communication metadata has been transmitted to anomaly detection service 106, agent 116 can delete the aggregated network communication metadata from the local database to free up space for collection of additional network communication metadata.

In an embodiment, as described in further detail below, anomaly detection service 106 can determine existence of the anomalous behavior based on the aggregated network communication metadata by sanitizing the aggregated network communication metadata to remove any illegal or malformed data by using a set of filters and extracting feature vectors from the sanitized data such that the anomaly detection service 106 can detect whether the sanitized data is indicative of existence of the anomalous behavior or is representative of normal traffic using a trained anomaly detection model.

In embodiments of the present invention, certain processing is said to be performed on the server-side, representing one or more of gateway device 104, anomaly detection service 106, integration service 108, UI 110 and/or storage service 112. According to one embodiment, gateway device 104 includes an API (e.g., a Representational State (REST) ful API) or a web services interface that provides an entry point to the cloud based service and can additionally be responsible for middleware functionality including request authentication, authorization, throttling, load balancing, routing, and the like. Additionally, gateway device 104 can add certain metadata to enrich currently ingested data received from endpoint device 102. This additional metadata may include geo-location for network traffic and risk scores associated with cryptographic signatures of applications. Endpoint traffic analysis service 114 of gateway device 104 can stream data into storage service 112, which can ensure that the data is consistently persisted and is accessible for processing, while tolerating partial data loss that can occur in a distributed environment.

According to an implementation, user interface (UI) 110 can request data for search, visualization purposes and analytics purposes via gateway device 104 ensuring that each request has correct permissions to access needed data from storage service 112. Further, integration service 108 can provide API capability to integrate with external systems such as security information and event management (STEM) engines or other ingestion systems. API can allow exporting data and machine learning alerts.

According to an implementation, anomaly detection service 106 can detect sophisticated attacks via supervised and/or unsupervised learning techniques, such as deep learning with feedback. For example, anomaly detection service 106 can enable a user to provide feedback during training in order to improve detection rates of the models. Overall functioning of endpoint traffic analysis service 114 is explained further below with reference to FIGS. 7A, 7B and 8.

Figure 2:
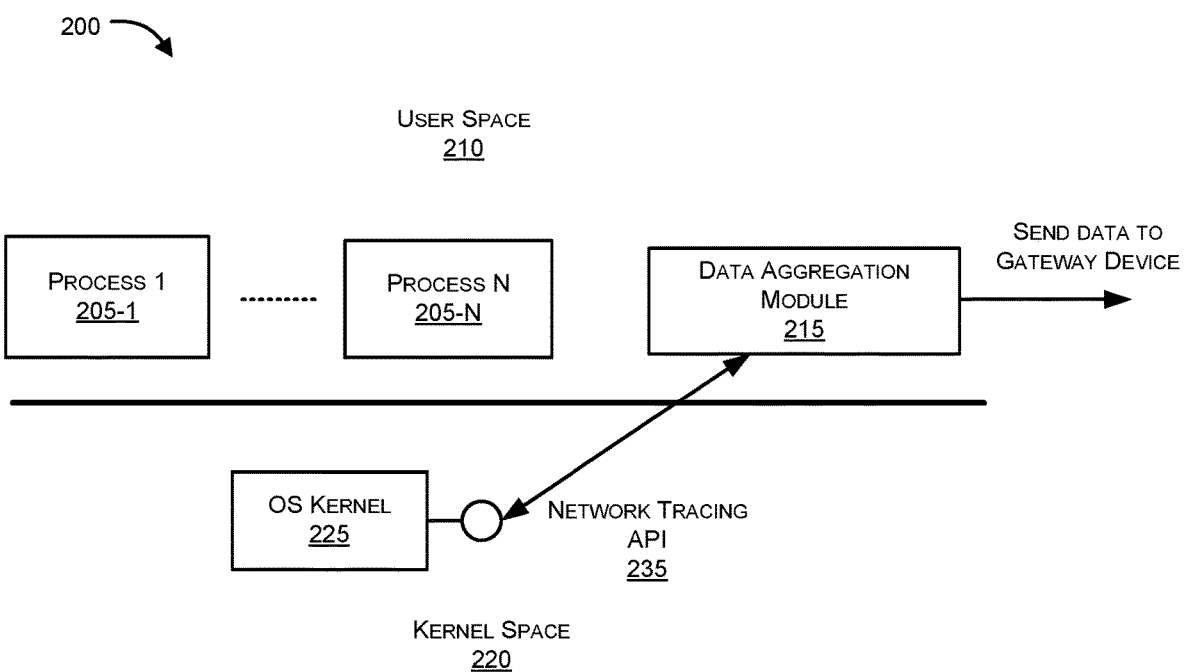
FIG. 2 illustrates exemplary interaction between user space and kernel space of an endpoint device in accordance with an embodiment of the present invention.

FIG. 2 illustrates exemplary interactions between user space and kernel space of a monitored endpoint device 200 in accordance with an embodiment of the present invention. In the context of the present example, a data aggregation module 215, representing a portion of the agent running on endpoint device, is user-mode code that is executed in user space 210 of a virtual memory provided by OS of endpoint device 200. Data aggregation module 215 collects network communication metadata by receiving callbacks from a kernel-level tracing facility implemented within the OS of the endpoint device, which may be implemented, for example, in the form of a network tracing API 235 of OS kernel. The callbacks can be responsive to system calls made by processes 205-1, 205-2 . . . 205N, which can relate to network events including receipt or transmission of one or more packets by endpoint device 200 via a network to which the endpoint device is coupled.

According to one embodiment, data aggregation module 215 subscribes to network-related internal API calls directly or indirectly via the kernel-level tracing facility (e.g., network tracing API 235), enabling data aggregation module 215 to receive network metadata associated with, among other things, the user and process that initiated the network-related internal API call, as well as parameters associated with the call. Those skilled in the art will appreciate that such network-related internal API calls are normally performed in kernel space 220, however the network metadata subscriber (i.e., data aggregation module 215) need not be implemented in kernel space 220. In the context of the present example, data aggregation module 215 is shown as being executed within user space 210, which has the advantage of leaving a smaller attack surface.

In one embodiment, the data format used by data aggregation module 215 is designed to accommodate for differences among various endpoint platforms to facilitate universal and cross platform applicability. Those skilled in the art will appreciate, however, at the lower level, some platform specific code may need to be developed to allow data aggregation module 215 to interact with platform specific network trace APIs (e.g., subscribing to or otherwise hooking desired network-related internal API calls to be notified of such calls or to intercept such calls). According to various embodiments, network metadata is captured by data aggregation module 215 responsive to receipt of a callback initiated by the kernel-level network trace API and no actual network packet data is captured. In this manner, simpler system design is provided that both avoids complications found in conventional network traffic analysis approaches and requires less storage space than conventional network traffic analysis approaches. For example, there is no need to deploy a locally trusted certificate for on-the-fly decryption of Transport Layer Security (TLS) for deep packet inspection.

As discussed further below, in an embodiment, data aggregation module 215 can collect the following network communication metadata:
- A PID that uniquely identifies the active process that initiated the network activity at issue
- Date and time with local time offset
- Aggregation time interval
- Number of bytes sent
- Number of bytes received
- Source IP address, port, hostname
- Destination IP address, port, hostname
- Protocol used for the packet transfer at issue
- Machine name (hostname) involved in the transfer at issue
- User name of the user that initiated the network activity
- Application that initiated the network activity
- Application hash (e.g., Message Digest hash value (e.g., MD2, MD4, MD5 or MD6), Secure Hash Algorithm hash value (e.g., SHA-1, SHA-2, or SHA-3), or the like)
- Activity (data sent or data received)

The collected network communication metadata may be stored in a relational database (not shown). In one embodiment, the relational database supports encryption to protect against certain types of attacks and/or other unauthorized access to the database.

In an embodiment, data aggregation module 215 can perform a time-based data aggregation on the collected network metadata to reduce transmission bandwidth and local storage requirements of the endpoint device. The collected network metadata can be aggregated on the endpoint using a predetermined or configurable fixed time interval (e.g., 1 minute, 5 minutes, 10 minutes, etc.). For example, within the fixed time interval all network communication metadata from the same device and user and application and sent to the same destination and host and port and protocol can be aggregated into one metadata transfer object with the count for bytes sent and received updated during the fixed time interval. In one embodiment, when the current time interval expires, data aggregation module 215 can create a data transfer object, compresses the data transfer object and writes the data transfer object to a database on the endpoint device. When a network connection to the gateway (e.g., gateway device 104) associated with the cloud-based endpoint traffic analysis service is available (as represented by the endpoint device being connected to the enterprise network), the aggregated data can be sent via an API provided by the gateway device using an encrypted channel, for example, using Hyper Text Transfer Protocol Secure (HTTPS).

Figure 3:
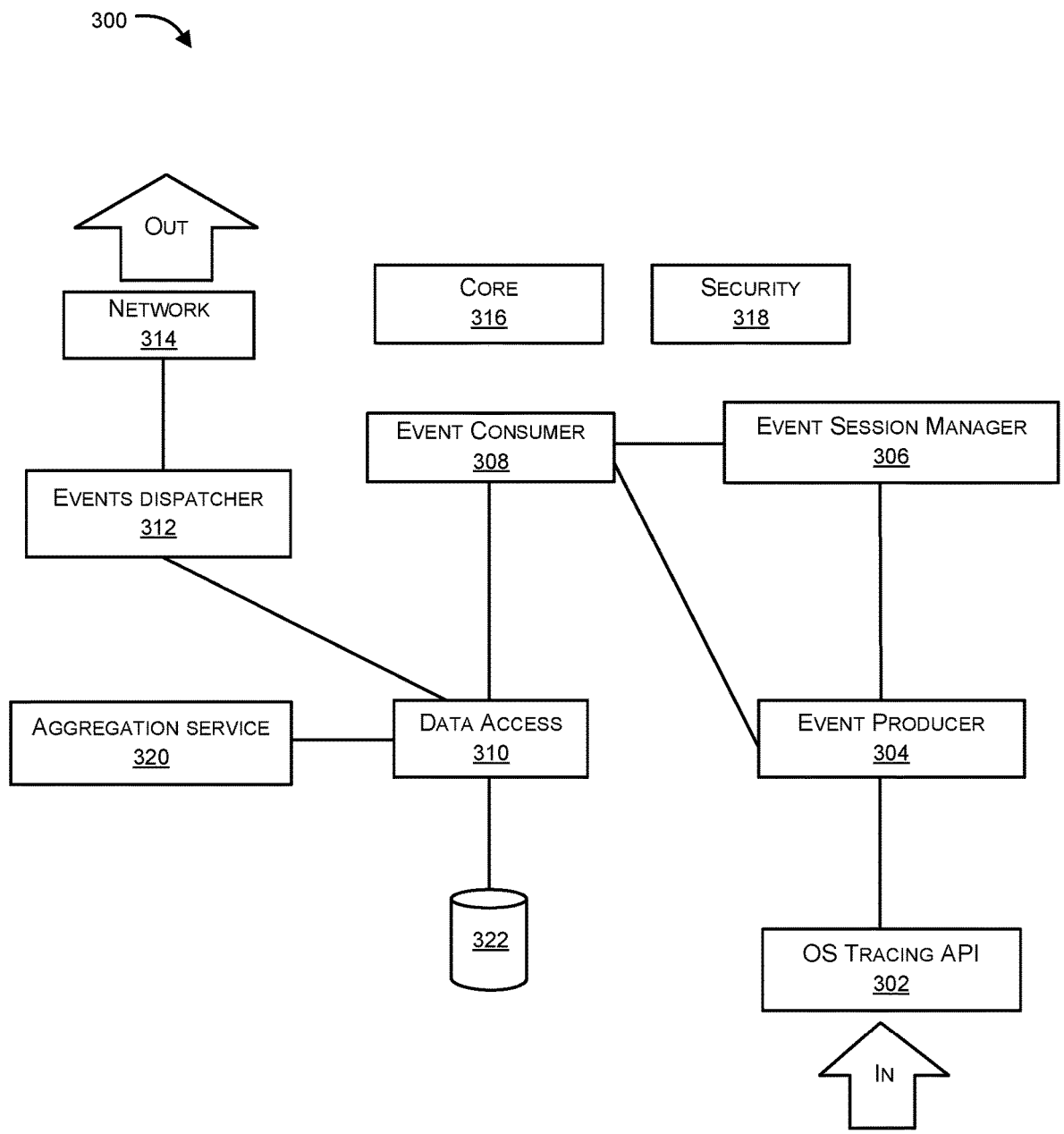
FIG. 3 is a block diagram illustrating functional components of an endpoint device in accordance with an embodiment of the present invention.

FIG. 3 is a block diagram illustrating functional components of an endpoint device in accordance with an embodiment of the present invention. Those skilled in the art will appreciate that various OS kernels provides a set of APIs including those for trace reporting functionality. OS kernels providing such functionality also include a mechanism for turning on and off high-performance and low latency counters designed for fast and lightweight debugging and tracing of OS internals. The trace facility is typically switched off by default and is enabled on a request. In the context of the Windows OS, the tracing facility can be controlled by ETW.

Embodiments of the present disclosure only require a small subset of tracing calls (which are represented in the context of FIG. 3 by OS API calls 302) to be enabled on the OS, for example, those network API calls using TCP/IP and UDP protocols. Once enabled, the OS can start collecting network communication metadata about these networking calls. In some OSs, the trace facility aggregates network calls on a 1 second interval such that if one application sends traffic to the same destination using multiple TCP/IP or UDP packets, the OS will provide a single event representing the multiple packet transfer, thereby aggregating the network metadata reported to the agent. This very limited aggregation of network calls that occur within a very small time interval on the order of one second by the OS, is not the same as the time-based aggregation of the collected network metadata that is performed by the agent. Ad described further below, the time-based aggregation of network metadata collected by the agent is performed in user space responsive to the network metadata received from the OS trace facility (whether aggregated or not) and is over a much longer time interval on the order of one to several minutes.

For purposes of illustration, a brief example is now provided for registering a callback function that is to receive trace events with the ETW tracing facility. Applications subscribe to the ETW API, by invoking a StartTrace API. Several parameters can be specified and passed as an argument to the StartTrace API, which can include:
- setting a generic callback function that receives events from the tracing session setting LogFileMode to EVENT_TRACE_REAL_TIME_MODE to enable real time in-memory data collection enabling flags that contain at least EVENT_TRACE_FLAG_NETWORK_TCPIP to provide collection of TCP IP and UDP traffic data setting a WNODE to specify SystemTraceControlGuid or another Globally Unique Identifier (GUID) that allows operating system-wide global data processing.

In context of the present example, a session can be updated/queried/flushed/stopped using the ControlTrace API. Further, to connect to a tracing session an OpenTrace API can be invoked. Finally, to start receiving events, an application can call a ProcessTrace API. ETW requires a multithreading application, which assumes that there can be one thread dedicated to ETW session management and one thread dedicated to calling a ProcessTrace API that blocks the thread until the session is stopped. A callback function can be implemented on a separate thread. The callback function that may be represented in the following form:

```
void_stdcallTraceSession::OnEventCallback(const
    PEVENT_TRACE pRecord){ ... }
``` where, const PEVENT_TRACE pRecord represents an aggregated or non-aggregated event provided by the OS and is considered an input to the callback function.

According to one embodiment, an event session manager 306 is responsible for the lifetime of tracing facility. Event session manager 306 can start the session, create threads, configure parameters and handle errors. If a session is dropped, event session manager 306 can reconfigure and start the session again. Event session manager 306 can be also responsible for configuring an event producer 304 and event consumer 308. Event session manager 306 may create a shared buffer used by event producer 304 and event consumer 308, for example, a shared memory that allows multithreaded access by event producer 304 and event consumer 308.

According to an embodiment, event producer 304 is responsible for receiving events from the trace session and passing the events on to event consumer 308. Event producer 304 can be exceptionally fast and lightweight by not performing any non-trivial processing as any significant delay by event producer 304 can result in the OS trace session being suspended as a result of slowing down of the application, thereby not allowing notification of the events. Further, event producer 304 is required to validate that the received events have correct GUIDs that correspond to expected network API calls and that the received data appears to be valid. After validation, the generic event must be casted to a specific network event and such application specific network event containing all the necessary information may require more intensive processing.

Figures 4B, 4C:

According to an embodiment, event consumer 308 receives events from event producer 304 and can perform additional data validation and/or data enrichment. Event consumer 306 may, for example, validate various attributes of the event received from event producer 204. For example, event consumer 308 may verify that the size of data transfer is greater than 0, the IP address is valid etc. Event consumer 308 may also resolve a DNS for the IP address using the OS DNS resolver and local cache. Once an event has been validated and enriched with additional metadata (e.g., a DNS for the source and the destination IP addresses) the metadata can be saved to a local database 322. FIGS. 4A-C illustrate exemplary tables (400, 420 and 430) used for aggregation of network communication metadata, where table 400 represents exemplary network metadata table, which can include collected network communication metadata and can be stored in database 322.

According to an embodiment, data access 310 can be responsible for providing an API to create, read, update and delete (CRUD) data in database 322. Database 322 can be a local embedded lightweight and encrypted database, for example, SQLite. Data access 310 can abstract database 322 specific calls by exposing high level data access techniques. Database 322 can be responsible for storing events and providing an API for aggregation of metadata. In an example, a relational database is used as it is a natural fit for information aggregation by representing data in relational sets. Database 322 can support encryption to disallow certain attacks, such as plain copy of a file, unauthorized access, etc.

According to an embodiment, an aggregation service 320 is responsible for periodically performing data aggregation in database 322. Aggregation service 320 can prepare data to be exported from database 322 and may allow different levels of time-based aggregation (e.g. 1-minute, 10-minute, 1-hour, 1-day and the like) on the collected metadata. Aggregation service 320 may copy data into separate tables in database 322 for convenient access and export. In an example, aggregation service 320 can run a variant of a Structured Query Language (SQL) query on the original dataset stored in database 322 and can save the results into a separate table. Table 420 represents an exemplary aggregation table, which can be stored in database 322 for transmission to enterprise traffic analysis service for anomaly detection.

According to an embodiment, an event dispatcher 312 is responsible for reading a batch of aggregated events, compressing the aggregated metadata, transferring the aggregated metadata to the gateway device for processing and handling success-failure transfer scenarios. Therefore, event dispatcher 312 detects when a connection between the endpoint device and enterprise network is established so that aggregated data can be sent to the gateway device. When the aggregated data is successfully sent to the gateway device, event dispatcher 312 can clean up database 322 if the data is no longer required or mark data in the database 322 as successfully sent. When aggregated data is not successfully transferred to the gateway device, event dispatcher 312 can be responsible for retry logic with increasing delay.

According to an embodiment, network component 314 establishes secure and authenticated connection with the gateway device. In an example, the endpoint device can use HTTP 2 with modern cypher suit or alternately, revert back to HTTP1 if HTTP 2 is not supported, with standard HTTPS encryption to send data. Network component 314 can attempt to use a sticky session that allows the streaming of data to the same gateway device that was assigned by a load balancer. Further, network component 314 can use TCP/IP session to reduce communication used to establish secure channel.

According to an embodiment, core 316 can be used by all the components of the endpoint device as core 316 can be responsible for maintaining a domain model for the application. Core 316 can contain utility functions used for parsing and conversion of various data structures. Core 316 can be also responsible for application level logging and application level tracing and can contain remote error reporting, application update handling, data compression functionality, application hosting and other similar core functionality of the application. Table 430 represents an exemplary application table, which can include a log for each application.

According to an embodiment, security component 318 is responsible for application wide security by ensuring self-defense, such as protection from termination, application restart in case of a crash, protection from debugging, reverse engineering, file protection, registry access protection etc. Security component 318 can provide encryption/decryption, hash code generation, signature verification, and other similar crypto-related functionality.

Figure 5A:
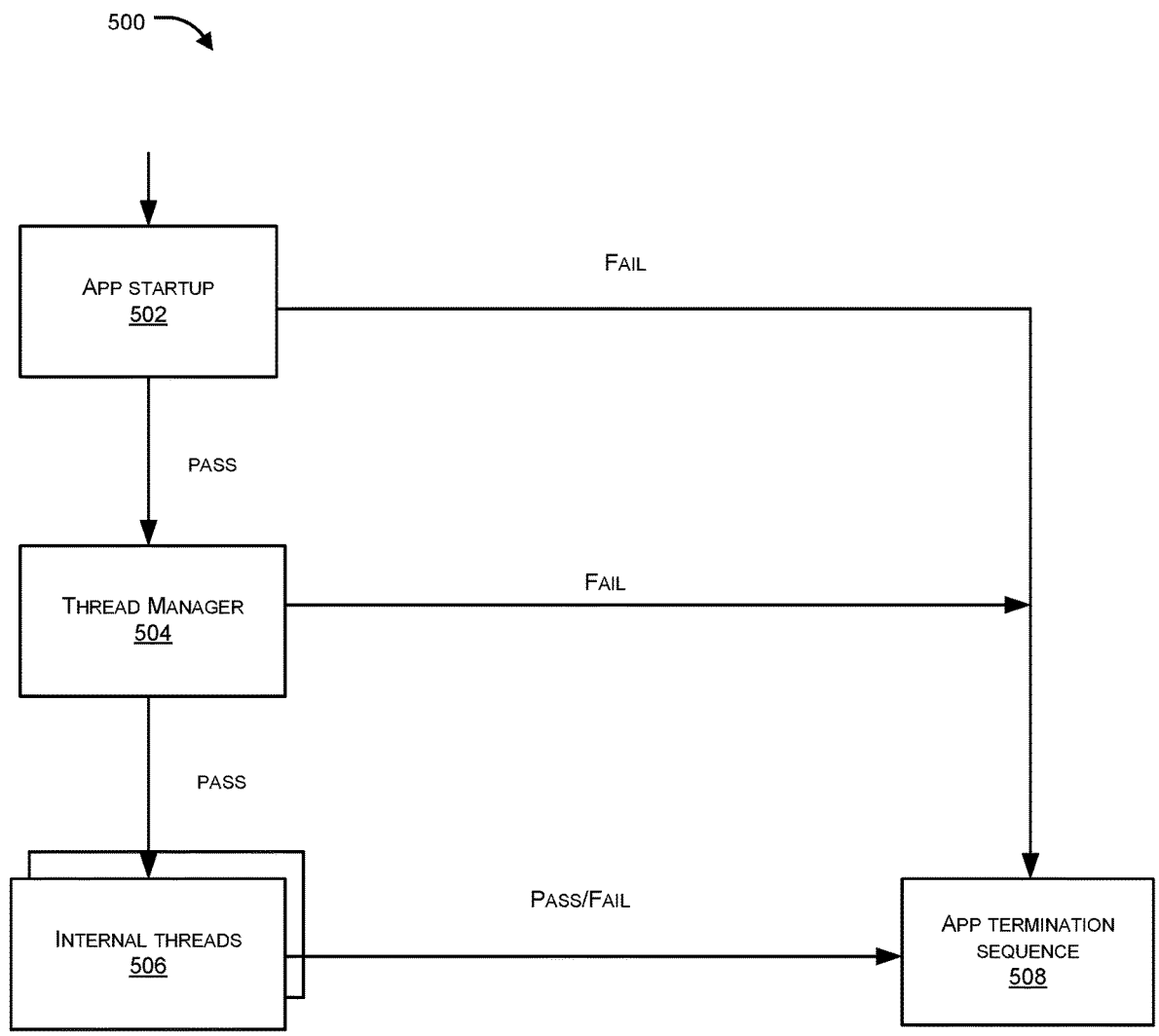
FIG. 5A is a flow diagram illustrating high-level client processing in accordance with an embodiment of the present invention.

FIG. 5A is a flow diagram 500 illustrating high-level client processing in accordance with an embodiment of the present invention. In the context of the present example, at block 502, agent of the endpoint device can invoke an application startup sequence including any or a combination of initializing a logging framework, reading a configuration file, initializing the application tracing framework, verifying the application signature, checking the integrity of components and expected files on local storage, verifying license information, performing license requests, contacting the server for additional information (including license verification, update profile, requesting the name of the agent, etc.) and submitting crash dumps if any new un-submitted crash dumps are available.

At block 504, the agent can invoke a thread manager sequence including any or a combination of creating internal threads, monitoring threads for status and detecting and handling failures in the threads. Further, at block 506, the agent can invoke an internal threads sequence, which runs individual components as described above with reference to FIG. 3. In case of failure at any of blocks 502, 504 and 506 or on processing of the internal threads sequence 506, at block 508 the agent can invoke an application termination sequence including any or a combination of logging reasons for termination, gracefully terminating and releasing of internal resources, and attempting to save information and attempting to schedule a restart in case of crash.

Figure 5B:
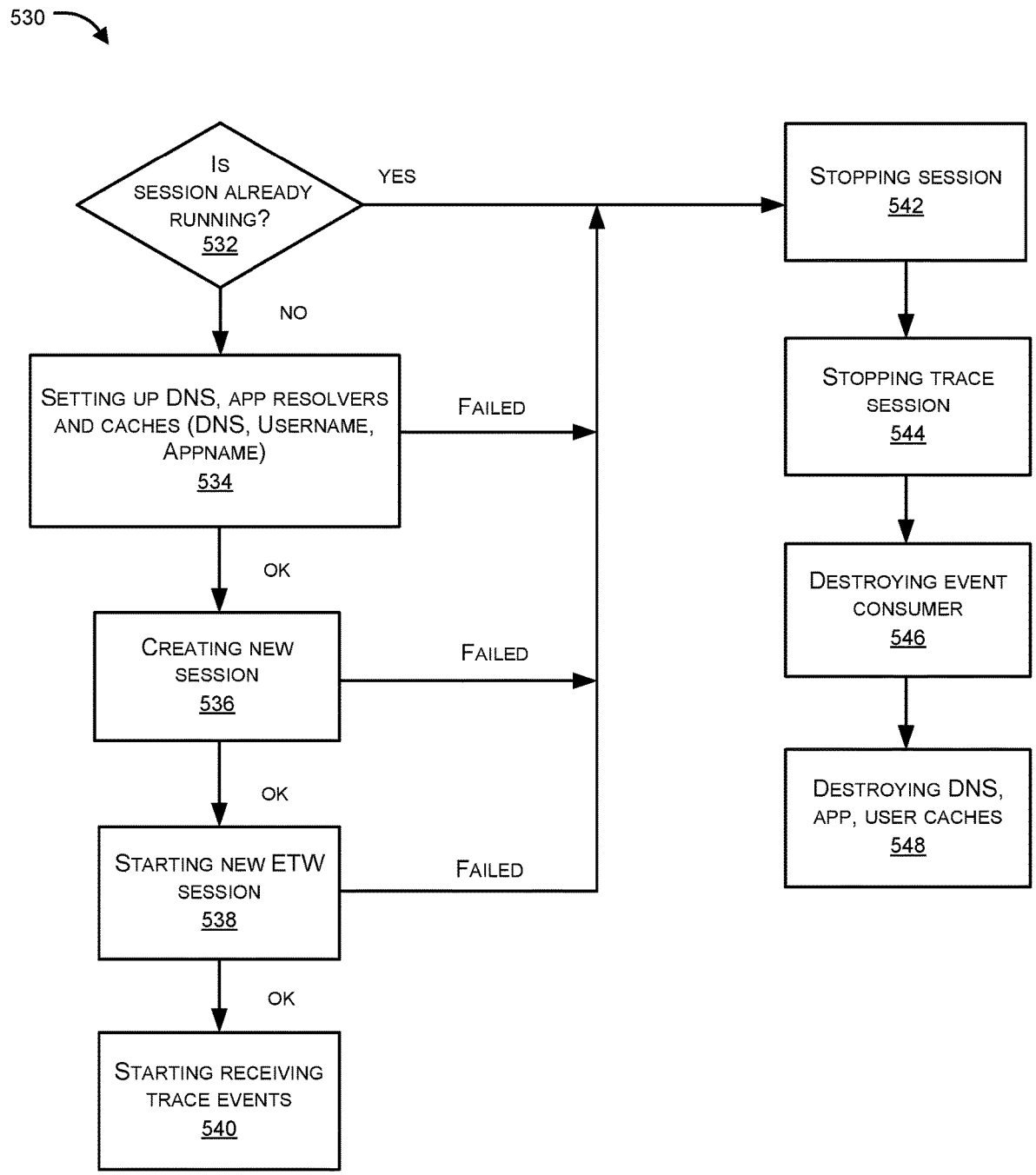
FIG. 5B is a flow diagram illustrating trace session setup processing in accordance with an embodiment of the present invention.

FIG. 5B is a flow diagram 530 illustrating trace session setup processing in accordance with an embodiment of the present invention. In context of the present example, at block 532, the agent can perform a check to determine if the trace session is already running. If not, processing continues with block 534 in which the agent sets up DNS, application resolvers and caches (e.g., a DNS cache, a username cache and an application name cache). At block 536, a new trace session (e.g., a session of a kernel-level tracing facility such as ETW) is created. At block 538, the new ETW session is started so that, at block 540, the agent can start receiving trace events.

If at block 532, the session was determined to already be running or if there is a failure at any of the blocks 534, 536 and 538, processing branches to block 542. At block 522, the agent can stop the session, including stopping the trace session, at block 544, destroying the event consumer, at block 546, and destroying DNS, application resolvers and caches (set up in block 534).

Figure 5C:
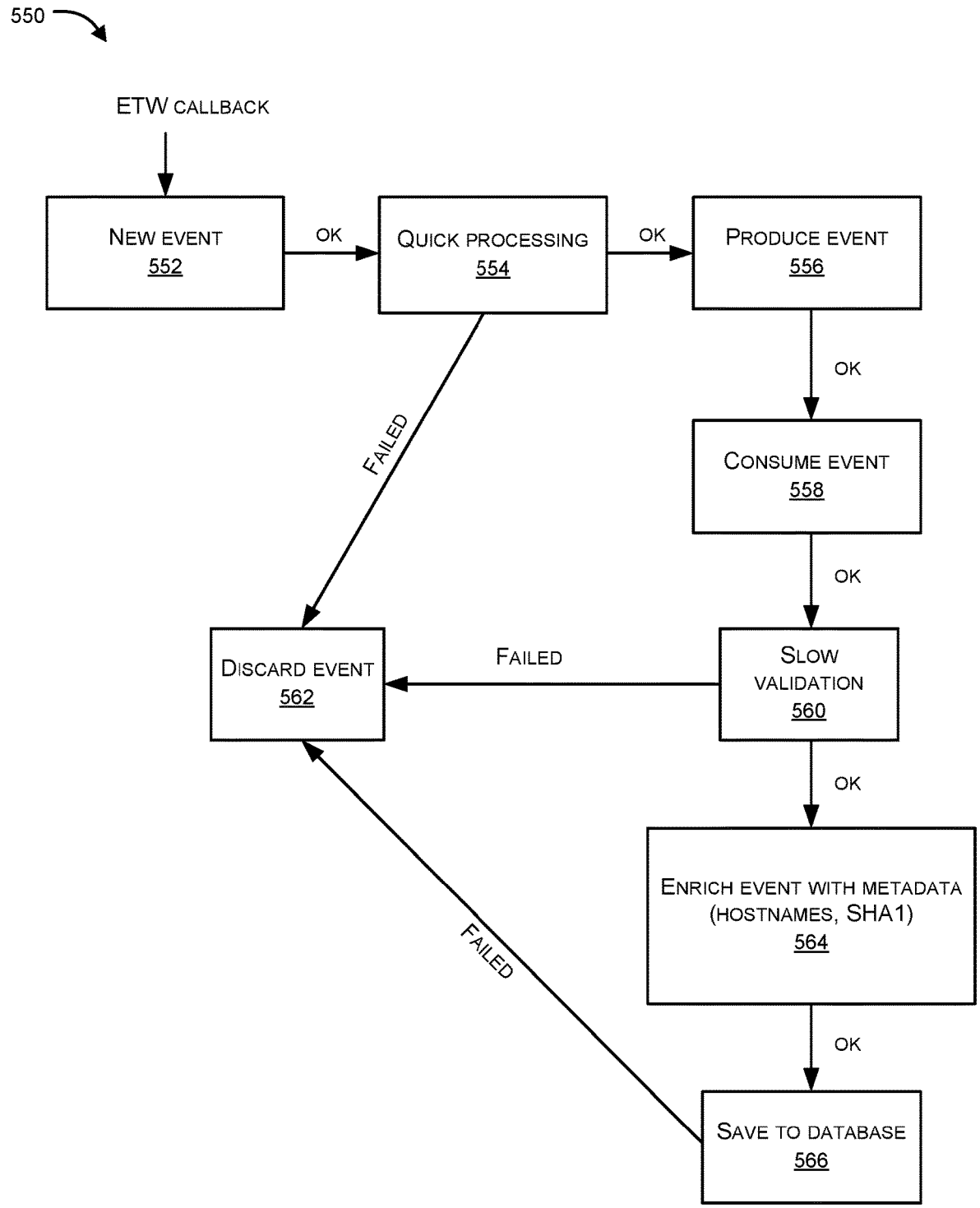
FIG. 5C is a flow diagram illustrating trace event processing in accordance with an embodiment of the present invention.

FIG. 5C is a flow diagram 550 illustrating trace event processing in accordance with an embodiment of the present invention. In context of the present example, at block 552, the agent is notified regarding the occurrence a new network event on the endpoint device. For example, the agent may be notified of the new event via an ETW callback function registered by the agent through the ETW tracing facility. At block 554, the agent can perform quick processing on the event. On successful processing, at block 556, the agent can produce an event in a form suitable for consumption by the event consumer using the event producer and at block 558, the agent can consume event using the event consumer as described above with reference to FIG. 3. Further, at block 560, slow validation is performed so that at block 564, the event can be enriched with metadata, if desired, and at block 566, the metadata can be saved to a local database. In case of failure at any of blocks 554, 560 and 566, at block 562, the agent can discard the event.

Figure 5D:
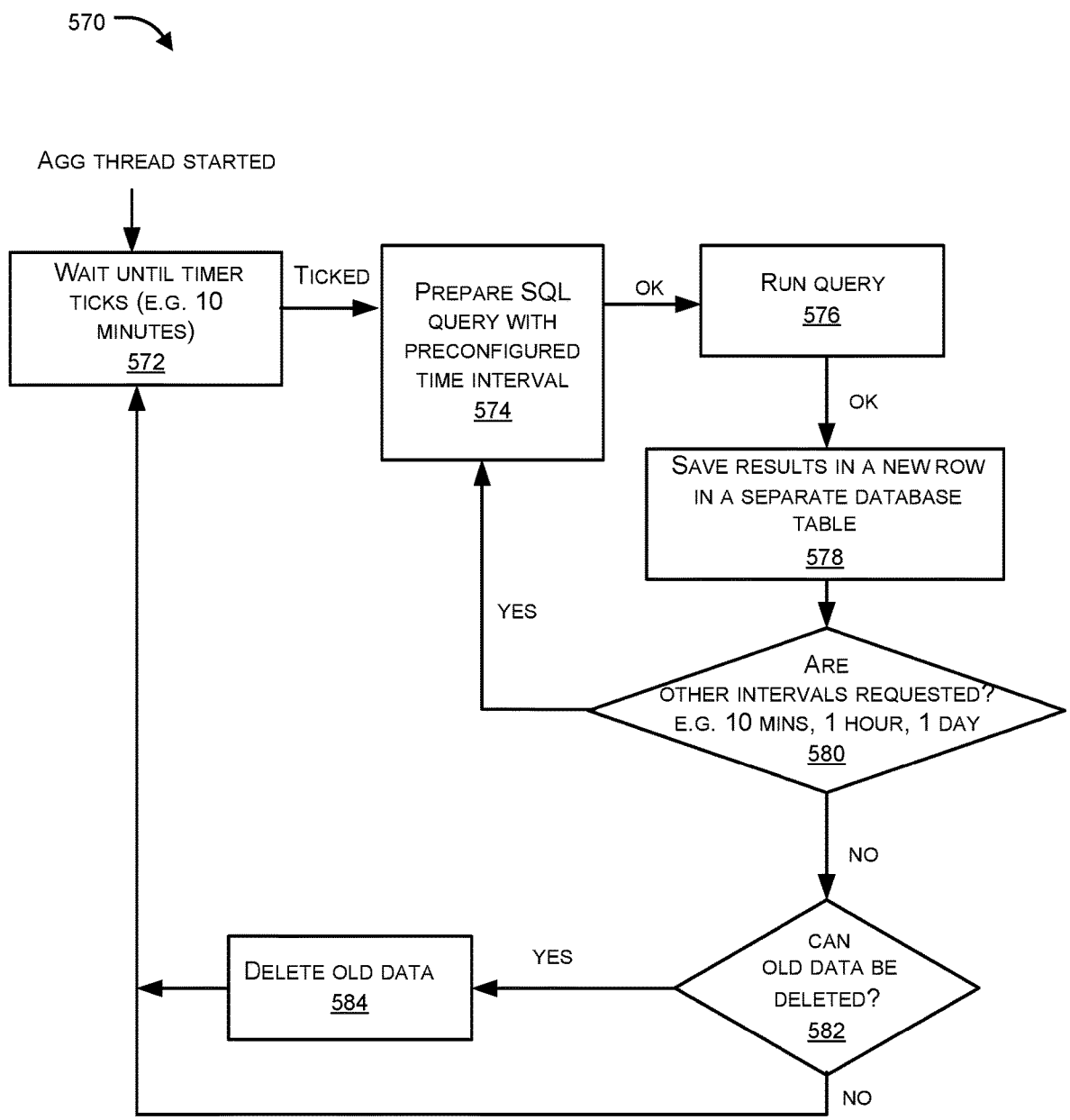
FIG. 5D is a flow diagram illustrating network metadata aggregation processing in accordance with an embodiment of the present invention.

FIG. 5D is a flow diagram 570 illustrating network metadata aggregation processing in accordance with an embodiment of the present invention. In context of the present example, when the aggregation thread is started, at block 572, the agent waits until it receives an indication that the predetermined or configurable fixed-time interval for performing the time-based data aggregation has elapsed. For example, a timer may be set to notify the aggregation thread every 10 minutes. When the timer ticks, at block 574, the agent can prepare an SQL query with a predefined time interval and at block 576, the agent can run the query on the database so that at block 578, the results of the SQL query can be stored in a new row of a separate database table. At block 580, the agent can check if other intervals are requested such that if other intervals are requested, the process can be repeated at block 574, by preparing another SQL query. Otherwise, at block 582, it can be checked whether old data can be deleted (e.g., it has already been successfully transferred to the gateway device) such that if old data can be deleted, at block 584, the agent can delete the old data and the process can continue at block 572.

Those skilled in the art will appreciate that the agent can check whether the endpoint device is connected to the enterprise network to determine if a network connection with the gateway device is available and responsive to an affirmative determination can send any batches of aggregated data that are ready to be sent. In an implementation, when a batch of aggregated data is to be sent, the agent can prepare a request, compress the data, and attempt to send the request to the gateway device. The batch of aggregated that has been compressed for data transfer can be marked as compressed and stored in a database in a compressed form. If the request has been successfully delivered, the gateway device can provide a notification, e.g., HTTP 200 OK response code, to the agent, subsequently the agent can free memory and data associated with this request. However, if the gateway device replies with an error response code, e.g., HTTP 401, HTTP 403, HTTP 500 etc. or if the gateway device does not reply to the request and a network packet sent timeout occurs, e.g., after 30 seconds from sending the request, the agent can mark the current data batch as failed, and can insert the data batch back to in the database for later retransmission. The agent can attempt to re-send failed data batches in parallel with current traffic. Further, the agent can increase the timeout between attempts, for example, using a logarithmic function (e.g., 5 seconds, 1 minute, 7 minutes, 10, minutes, 12 minutes, 13 minutes etc) between each new attempt to establish a network connection with the gateway device. Those skilled in the art will appreciate that the agent can send several batches of data in parallel while keeping track of the status of each batch, which can improve the effective data transfer rate. However, should several successive failures be observed, the agent can revert to sending a single batch at a time.

Figure 6:
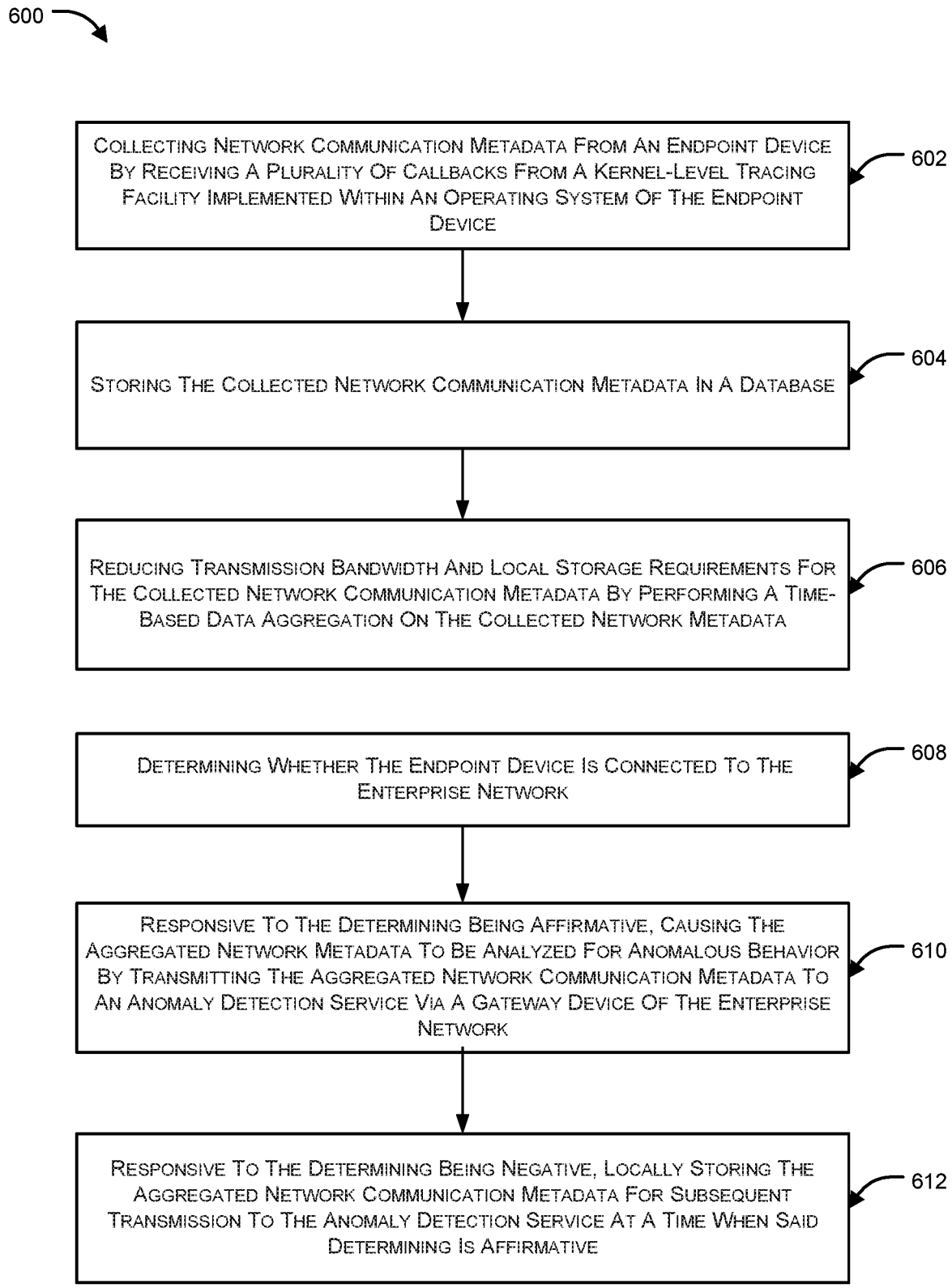
FIG. 6 is a flow diagram illustrating high-level processing performed by a light-weight agent running on an endpoint device in accordance with an embodiment of the present invention.

FIG. 6 is a flow diagram 600 illustrating high-level processing performed by a light-weight agent running on an endpoint device in accordance with an embodiment of the present invention. In the context of the present example, at block 602, an agent running on an endpoint device associated with an enterprise network can collect network communication metadata from the endpoint device by receiving multiple callbacks from a kernel-level tracing facility implemented within an OS of the endpoint device. The callbacks can be responsive to system calls relating to network events taking place on the endpoint device including receipt or transmission of one or more packets by the endpoint device via a network to which the endpoint device is coupled.

At block 604, the agent can store the collected network communication metadata in a database.

At block 606, the agent can reduce transmission bandwidth and local storage requirements for the collected network communication metadata by performing a time-based data aggregation on the collected network metadata.

At block 608, the agent can determine whether the endpoint device is connected to the enterprise network.

At 610, in response to an affirmative determination, by the agent, that the endpoint device is connected to the enterprise network, the agent causes the aggregated network metadata to be analyzed for anomalous and/or risky network behavior by transmitting the aggregated network communication metadata to an anomaly detection service via a gateway device of the enterprise network.

At block 612, in response to a negative determination, by the agent, indicating the endpoint device is not connected to the enterprise network, the agent can locally store the aggregated network communication metadata for subsequent transmission to the anomaly detection service responsive to an affirmative determination.

Figure 7A:
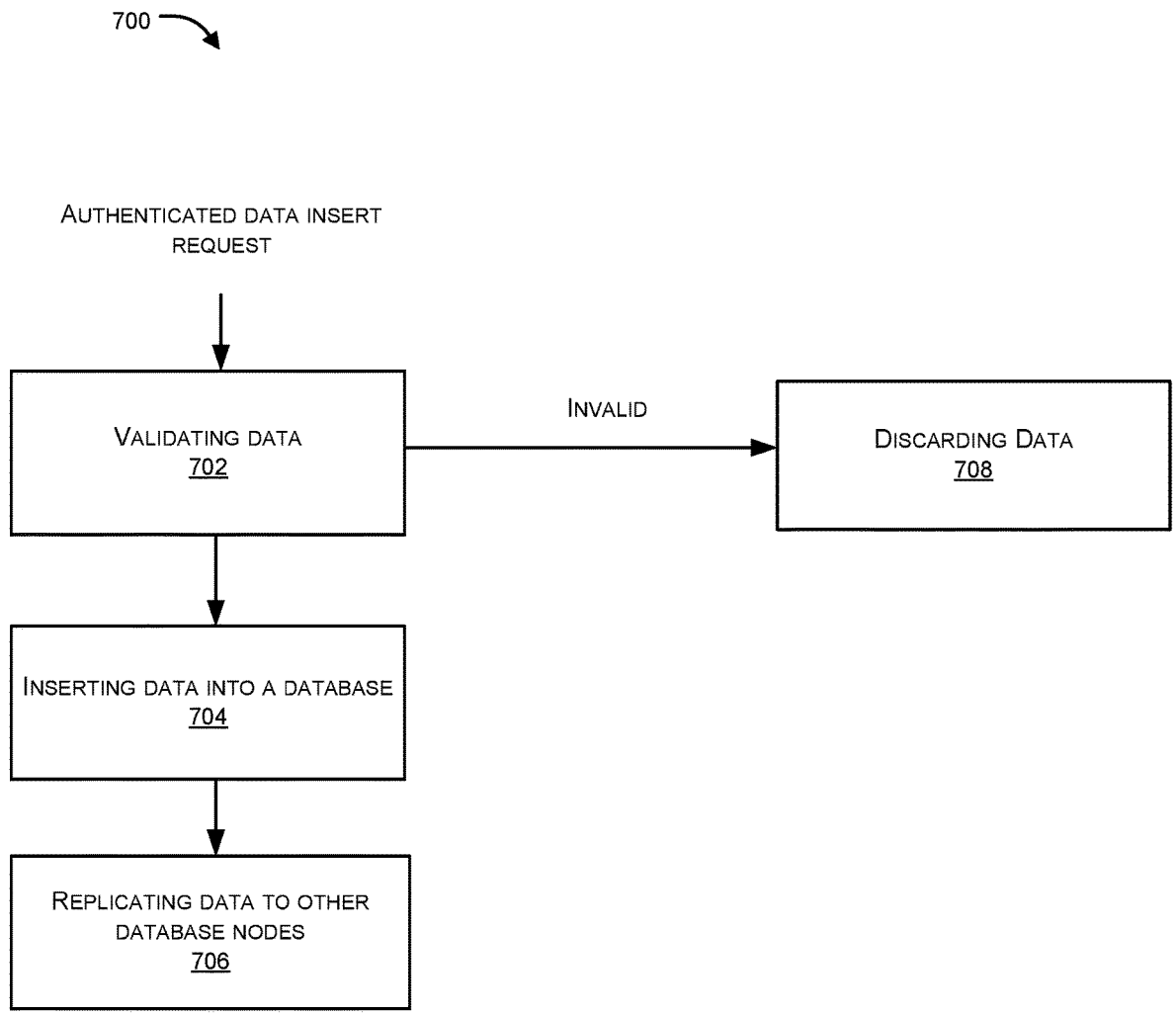
FIG. 7A is a flow diagram illustrating server-side data ingestion processing performed by an endpoint traffic analysis service in accordance with an embodiment of the present invention.

FIG. 7A is a flow diagram 700 illustrating server-side data ingestion processing performed by an endpoint traffic analysis service in accordance with an embodiment of the present invention.

Those skilled in the art will appreciate that in one embodiment the server-side comprises cloud based resources. In one embodiment, a gateway device associated with the enterprise network and including an API is responsible for authenticating endpoint devices, authorizing particular calls and routing requests. In an example, APIs that are exposed by the endpoint device can include OAuth 2 protocol or a similar protocol for authentication and authorization.

In an example, data APIs such as decompressed JavaScript Object Notation (JSON) is responsible for CRUD operations within the storage service. The endpoint device can generally call a create on the API to insert new data into the storage service. Each request from the endpoint device can contain information about an entity associated with the endpoint device. The storage service can provide a storage medium to store data for specific endpoint device in a specified storage, such as a separate server, database, or table. Data API components can invoke additional internal APIs to enrich incoming data, for example GeoIP resolution can be added to the incoming data and/or a security risk score associated with an application hash signature can also be added to the incoming data As illustrated in flow diagram 700, endpoint traffic analysis service of the gateway device, can receive an authenticated data insert request from an endpoint device. At 702, the endpoint traffic analysis service can validate the data and at 704 the endpoint traffic analysis service can insert the data into a database associated with the storage service. If the data is found to be invalid, at 708, the endpoint traffic analysis service can discard the data. Further, once the data is inserted into the database, at block 706 the database can be replicated to other nodes for fault tolerance, for example.

Figure 7B:
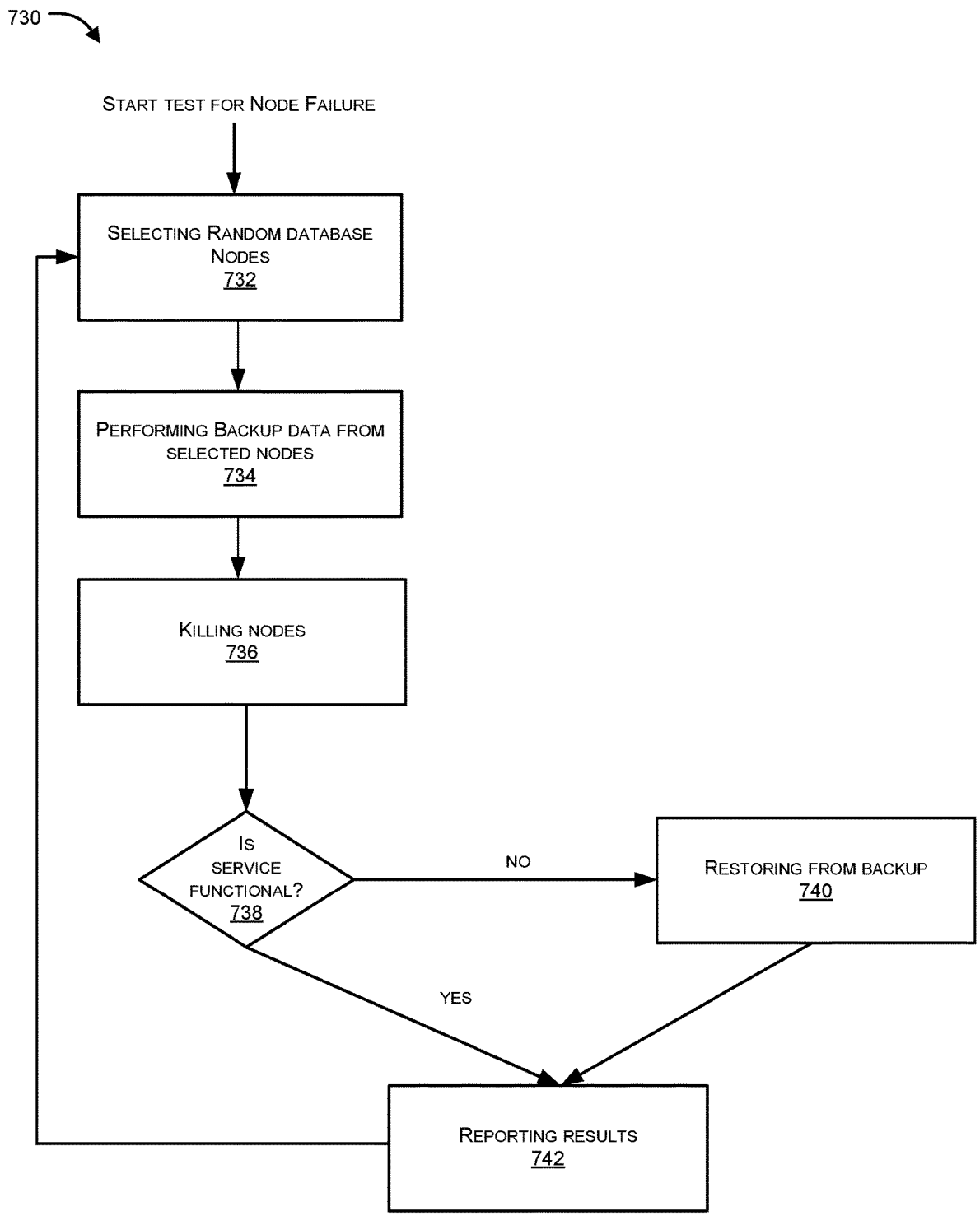
FIG. 7B is a flow diagram illustrating server-side node failure testing processing performed by an endpoint traffic analysis service in accordance with an embodiment of the present invention.

FIG. 7B is a flow diagram 730 illustrating server-side node failure testing processing performed by an endpoint traffic analysis service in accordance with an embodiment of the present invention. In the context of the present example, the endpoint traffic analysis service can start a test for node failure at block 732 by selecting random database nodes. At block 734, the service can perform a backup of the data from the randomly selected nodes. At block 736, the endpoint traffic analysis service can kill the randomly selected nodes whose data has been backed up. At 738, it can be determined whether the endpoint traffic analysis service remains functional or not in the absence of the nodes killed at block 736. If the endpoint traffic analysis service is not functional, at block 740, the data can be restored from the backup. Further, at block 742, the results can be reported and the process can be repeated at block 732 for continuous and/or periodic testing.

According to an embodiment, the endpoint traffic analysis service can use an anomaly detection model using deep learning across all data available in the system. For example, data may be gathered form different endpoint devices/service subscribers/organizations to build larger and more generic models. Multiple models can be trained to detect global normal activity, global anomalous activity, local (e.g. specific to an endpoint device/entity) network activity, anomalous local network activity, global known attacks etc. The models can be updated asynchronously and stored in a storage service such that the models can be retrieved and updated as soon as possible, for example, by performing a daily update check. In an example, neural networks can be used to perform machine learning. In another example, deep learning may be performed where large amount of data can be fed to artificial neural network such as a convolutional neural network or a recurrent neural network. The machine learning process can start from a data preparation tasks including sanitization of data and extraction of feature vectors. During sanitation, the data can pass through a set of filters that can allow only valid data and can drop any illegal or malformed data. In an example, any data can be converted to a single number or an array of numbers such that statistics, distributions and visualization of data can aid the process of feature extraction.

According to an implementation, data sets can be required to be split into training and detection sets. Initial training data set can be decided by a user or an external service, which can represent normal traffic to train the endpoint traffic analysis service to detect anomalies in normal traffic. The dataset can also be a representative sample of an attack, where the service can be trained to spot attacks in the network traffic. Training can run on a cluster of graphics processing units (GPUs) and can be integrated with cloud. The data can be fed to the cluster using API gateway and integration service.

Once training stage is complete, the data can be saved in a compressed binary format using the storage service. Anomaly detection service can schedule a run on a time interval using the latest models and/or some specific models to detect network attacks. The output of the anomaly detection service can be a decision indicating whether the new data is representative of normal traffic or representative of anomalous or risky network behavior. Any detected anomalies can be saved into the database together with the context regarding when and how the anomaly was generated for further reference.

Figure 8:
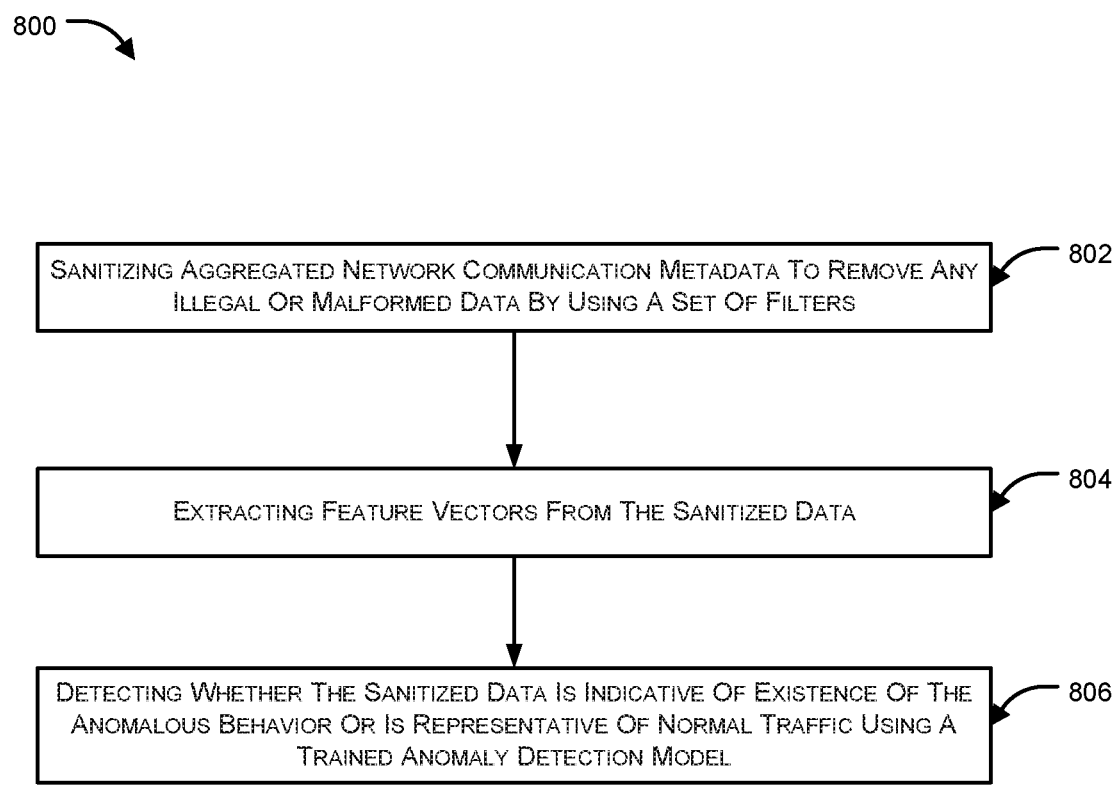
FIG. 8 is a high-level flow diagram illustrating an overall process performed by an endpoint traffic analysis service in accordance with an embodiment of the present invention.

FIG. 8 is a high-level flow diagram 800 illustrating an overall process performed by an endpoint traffic analysis service in accordance with an embodiment of the present invention. In the context of the present example, the endpoint traffic analysis service implementing the anomaly detection service can determine existence of anomalous or risky network behavior based on the aggregated network communication metadata by at block 802, sanitizing the aggregated network communication metadata to remove any illegal or malformed data by using a set of filters, at block 804, extracting feature vectors from the sanitized data and, at block 806, detecting whether the sanitized data is indicative of existence of the anomalous behavior or is representative of normal traffic using a trained anomaly detection model.

Embodiments of the present disclosure include various steps, which have been described above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 9:
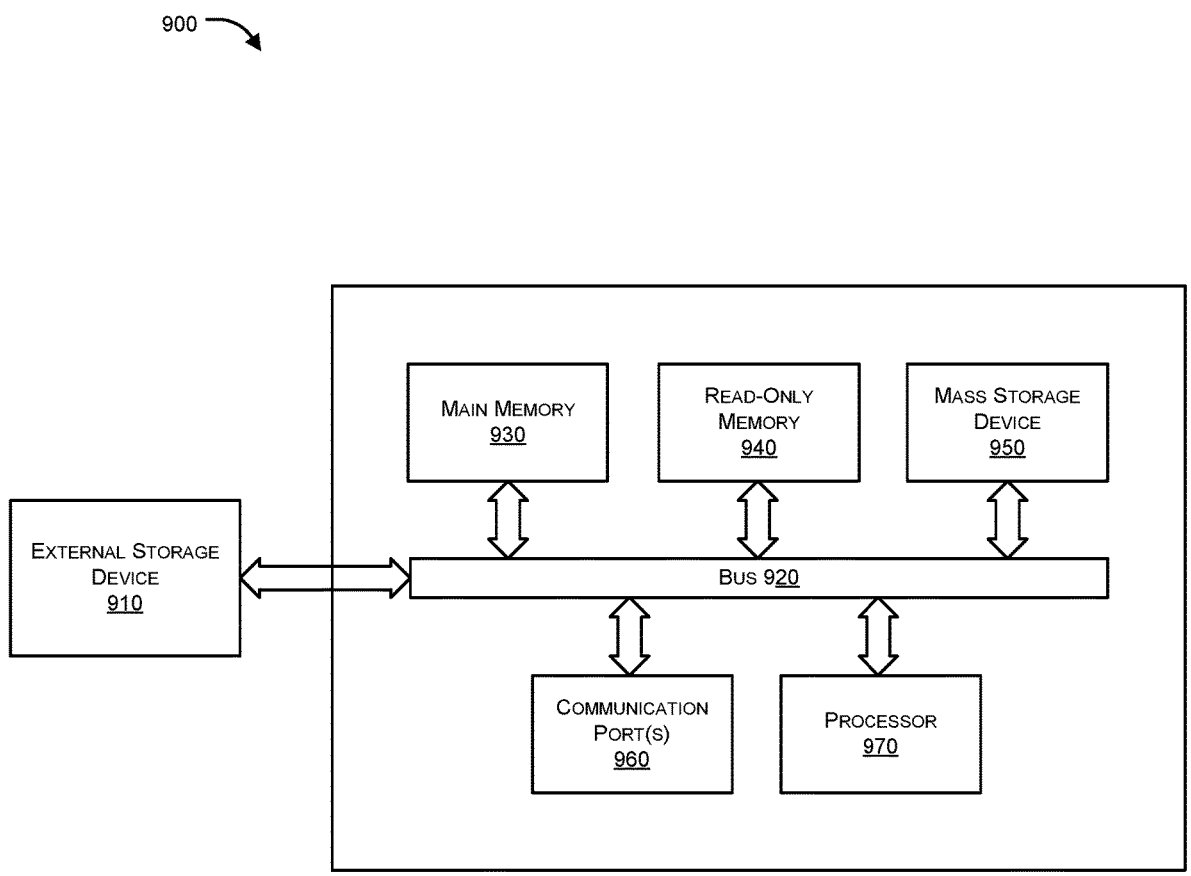
FIG. 9 illustrates an exemplary computer system in which or with which embodiments of the present invention may be utilized.

FIG. 9 illustrates an exemplary computer system 900 in which or with which embodiments of the present invention may be utilized.

As shown in FIG. 9, computer system includes an external storage device 910, a bus 920, a main memory 930, a read only memory 940, a mass storage device 950, a communication port 960, and a processor 970. Computer system may represent some portion of an endpoint device (e.g., endpoint device 102), a gateway device (e.g., gateway device 104).

Those skilled in the art will appreciate that computer system 900 may include more than one processor 970 and communication ports 960. Examples of processor 970 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 970 may include various modules associated with embodiments of the present invention.

Communication port 960 can be any of an RS-232 port for use with a modem based dialup connection, a 10/100 Ethernet port, a Gigabit or 10 Gigabit port using copper or fiber, a serial port, a parallel port, or other existing or future ports. Communication port 960 may be chosen depending on a network, such a Local Area Network (LAN), Wide Area Network (WAN), or any network to which computer system connects.

Memory 930 can be Random Access Memory (RAM), or any other dynamic storage device commonly known in the art. Read only memory 940 can be any static storage device(s) e.g., but not limited to, a Programmable Read Only Memory (PROM) chips for storing static information e.g. start-up or BIOS instructions for processor 970.

Mass storage 950 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 920 communicatively couples processor(s) 970 with the other memory, storage and communication blocks. Bus 920 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 970 to software system.

Optionally, operator and administrative interfaces, e.g. a display, keyboard, and a cursor control device, may also be coupled to bus 920 to support direct operator interaction with computer system. Other operator and administrative interfaces can be provided through network connections connected through communication port 960. External storage device 910 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Those skilled in the art will appreciate that embodiments of the present disclosure provide various advantages, for example, a historic forensic record of network traffic is created as the storage service stores aggregated metadata representing network communications. The storage service does not store actual captured network packets, which significantly reduces storage requirements and simplifies data acquisition. Further, due to the simplification, agents of the endpoint devices use minimal resources. Thus, the agent-based approach is well-suited for IoT traffic analysis or other devices with compute and memory restrictions. The aggregated metadata is suitable for machine learning enabling detection of sophisticated attacks via supervised and unsupervised learning techniques such as deep learning with feedback. The endpoint traffic analysis service provides analysis of DNS queries, traffic flow, normal and abnormal traffic flow and highlights use of unapproved tools, shadow IT (such as use of private cloud backup tools), risky behavior and provides access to historic forensic records of the enterprise network by even visualizing traffic recorded outside of the enterprise network. Based on above-mentioned advantages embodiments of the present disclosure are well suited for deployments in large scale enterprises, governments enterprises (including security and compliance, UEBA, network security), IoT, card payment terminals, hardware with limited CPU/Memory/Network bandwidth as well as small to medium enterprises.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
    collecting, by an agent running on an endpoint device associated with an enterprise network, network communication metadata from the endpoint device by receiving a plurality of callbacks from a kernel-level tracing facility implemented within an operating system of the endpoint device, wherein the plurality of callbacks are responsive to system calls relating to network events including receipt or transmission of one or more packets by the endpoint device via a network to which the endpoint device is coupled;
    storing, by the agent, the collected network communication metadata in a database;
    reducing transmission bandwidth and local storage requirements for the collected network communication metadata, by the agent, performing a time-based data aggregation on the collected network metadata;
    determining whether the endpoint device is connected to the enterprise network;
    responsive to said determining being affirmative, causing, by the agent, the aggregated network metadata to be analyzed for anomalous behavior by transmitting the aggregated network communication metadata to an anomaly detection service via a gateway device of the enterprise network; and
    responsive to said determining being negative, locally storing, by the agent, the aggregated network communication metadata for subsequent transmission to the anomaly detection service at a time when said determining is affirmative.

2. The method of claim 1, wherein the collected network communication metadata comprises any or a combination of:
    a process identifier associated with an active process running on the endpoint device that initiated a network event associated with the collected network communication metadata;
    a date and time associated with the network event;
    information indicative of an aggregation time interval over which the collected network communication metadata was aggregated;
    information regarding a number of bytes sent or received for the network event;
    a source Internet Protocol (IP) address associated with the network event;
    a source port associated with the network event;
    a source hostname associated with the network event;
    a destination IP address associated with the network event;
    a destination port associated with the network event;
    a destination hostname associated with the network event;
    information regarding a protocol used for packet transfer associated with the network event;
    a user name of a user of the enterprise that initiated the network event;
    information regarding an application that initiated the network event;
    an application hash of the application; and
    information regarding a type of activity associated with the network event.

3. The method of claim 1, wherein said performing a time-based data aggregation comprises running a variant of Structured Query Language (SQL) query with a predefined time interval on the database and saving results of the SQL query in a new row of a separate database table.

4. The method of claim 1, further comprising after the aggregated network communication metadata has been transmitted to the anomaly detection service, deleting the aggregated network communication metadata from the database.

5. The method of claim 1, wherein the agent executes within user address space of a virtual memory provided by the operating system.

6. The method of claim 1, wherein said collecting further comprises subscribing, by the agent, to network-related internal application programming interface (API) calls directly or indirectly via the kernel-level tracing facility.

7. The method of claim 6, wherein the agent indirectly interacts with the kernel-level tracing facility via Event Tracing for Windows (ETW).

8. The method of claim 1, wherein said determining whether the endpoint device is connected to the enterprise network comprises detecting, by an event dispatcher implemented within the agent, a network connection between the endpoint device and the gateway device.

9. The method of claim 1, wherein the anomaly detection service determines existence of the anomalous behavior based on the aggregated network communication metadata by:
    sanitizing the aggregated network communication metadata to remove any illegal or malformed data by using a set of filters;
    extracting feature vectors from the sanitized data; and
    detecting whether the sanitized data is indicative of existence of the anomalous behavior or is representative of normal traffic using a trained anomaly detection model.

10. A non-transitory computer-readable storage medium embodying a set of instructions, which when executed by one or more processors of an endpoint device associated with an enterprise network, causes the one or more processors to perform a method comprising:

collecting, by an agent running on the endpoint device, network communication metadata from the endpoint device by receiving a plurality of callbacks from a kernel-level tracing facility implemented within an operating system of the endpoint device, wherein the plurality of callbacks are responsive to system calls relating to network events including receipt or transmission of one or more packets by the endpoint device via a network to which the endpoint device is coupled;

storing, by the agent, the collected network communication metadata in a database;

reducing transmission bandwidth and local storage requirements for the collected network communication metadata, by the agent, performing a time-based data aggregation on the collected network metadata;

determining whether the endpoint device is connected to the enterprise network;

responsive to said determining being affirmative, causing, by the agent, the aggregated network metadata to be analyzed for anomalous behavior by transmitting the aggregated network communication metadata to an anomaly detection service via a gateway device of the enterprise network; and responsive to said determining being negative, locally storing, by the agent, the aggregated network communication metadata for subsequent transmission to the anomaly detection service at a time when said determining is affirmative.

11. The non-transitory computer-readable storage medium of claim 10, wherein the network communication metadata comprises any or a combination of:

a process identifier associated with an active process running on the endpoint device that initiated a network event associated with the collected network communication metadata;

a date and time associated with the network event;

information indicative of an aggregation time interval over which the collected network communication metadata was aggregated;

information regarding a number of bytes sent or received for the network event;

a source Internet Protocol (IP) address associated with the network event;

a source port associated with the network event;

a source hostname associated with the network event;

a destination IP address associated with the network event;

a destination port associated with the network event;

a destination hostname associated with the network event;

information regarding a protocol used for packet transfer associated with the network event;

a user name of a user of the enterprise that initiated the network event;

information regarding an application that initiated the network event;

an application hash of the application; and information regarding a type of activity associated with the network event.

12. The non-transitory computer-readable storage medium of claim 10, wherein said performing a time-based data aggregation comprises running a variant of Structured Query Language (SQL) query with a predefined time interval on the database and saving results of the SQL query in a new row of a separate database table.

13. The non-transitory computer-readable storage medium of claim 10, wherein after the aggregated network communication metadata has been transmitted to the anomaly detection service, the method further comprises deleting the aggregated network communication metadata from the database.

14. The non-transitory computer-readable storage medium of claim 10, wherein the agent executes within user address space of a virtual memory provided by the operating system.

15. The non-transitory computer-readable storage medium of claim 10, wherein said collecting further comprises subscribing, by the agent, to network-related internal application programming interface (API) calls directly or indirectly via the kernel-level tracing facility.

16. The non-transitory computer-readable storage medium of claim 15, wherein the agent indirectly interacts with the kernel-level tracing facility via Event Tracing for Windows (ETW).

17. The non-transitory computer-readable storage medium of claim 10, wherein said determining whether the endpoint device is connected to the enterprise network comprises detecting, by an event dispatcher implemented within the agent, a network connection between the endpoint device and the gateway device.

18. The non-transitory computer-readable storage medium of claim 10, wherein the anomaly detection service determines existence of the anomalous behavior based on the aggregated network communication metadata by:

sanitizing the aggregated network communication metadata to remove any illegal or malformed data by using a set of filters;

extracting feature vectors from the sanitized data; and detecting whether the sanitized data is indicative of existence of the anomalous behavior or is representative of normal traffic using a trained anomaly detection model.

* * * * *